April 16, 1935.  W. F. DEHUFF  1,998,120
WHISK
Filed June 6, 1934  3 Sheets-Sheet 1

INVENTOR
Walter F. Dehuff
BY
Sydney D. Prescott
ATTORNEY

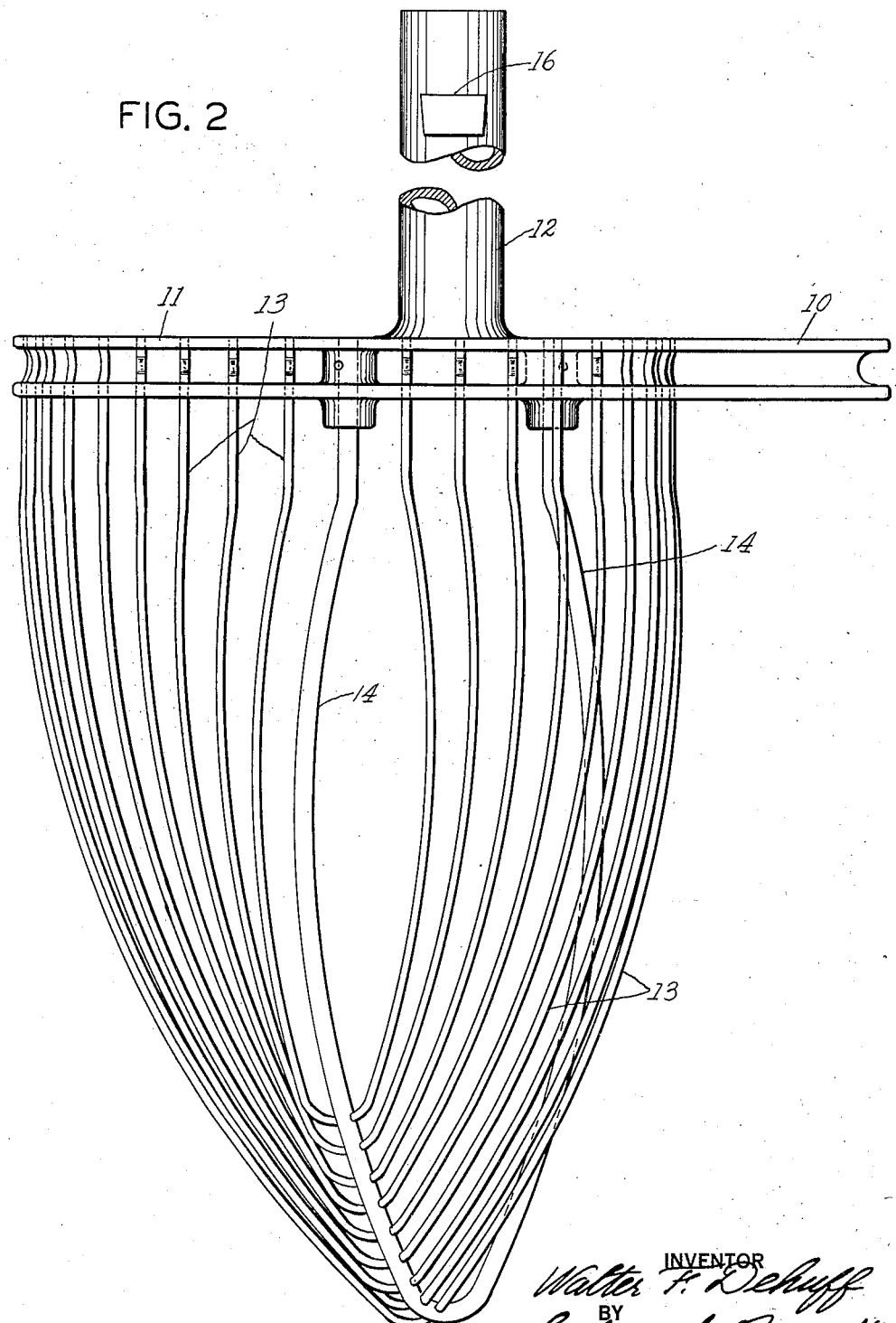

April 16, 1935. W. F. DEHUFF 1,998,120
WHISK
Filed June 6, 1934   3 Sheets-Sheet 3

INVENTOR
Walter F. Dehuff
BY
Sydney Prescott
ATTORNEY

Patented Apr. 16, 1935

1,998,120

UNITED STATES PATENT OFFICE 1,998,120

WHISK

Walter Franklin Dehuff, Glen Rock, Pa., assignor to American Machine & Foundry Company, a corporation of New Jersey Application June 6, 1934, Serial No. 729,318

5 Claims. (Cl. 259—133)

This invention relates to whisks which may be used wherever light and rapid mixing of the constituents of baked goods is needed. The main object of the invention is to provide a wire whisk designed to have a scooping or cupping effect to displace the whisked material radially from the sides of the mixing bowl.

This effect is obtained by making the whisk in the form of a beater head having a pair of arcuate frames which have an eccentric or offset relation to each other. On each of the frames there is mounted a series of bent wires having their ends secured in their respective frames and having their bights supported in a bowed reinforcing rib connecting the two frames and extending to the bottom of the mixing bowl.

Bakers know that the quality of their baked goods, when eggs or egg whites are used as a constituent, is largely determined by the way the eggs or whites are broken down into foam. When whisking by handing a lifting and aerating action is imparted to the whisk by the hand of the baker, and as the albumen in the egg whites is broken up into aerated particles (foam) this lifting action is increased to include the whole batch until the same is completely worked out. The "folding in" of flour is always a delicate operation requiring good judgment and care, and when performed manually is always under the control of the operator who conducts it in accordance with the appearance and feel of the batch.

With the present whisk the attendant can control and secure the lifting and aerating action so necessary to break down albumen into small particles of foam, by gradually increasing the speed of rotation of the whisk in accordance with the appearance and feel of the batch. Due to the eccentric construction of the whisk and the novel arrangement of the whipping wires therein, the lifting and foaming action of a manually operated beater may be simulated so that the flour may be "folded in", even with an angel food cake batch, as evenly and thoroughly as may be done by hand.

Starting the whisk in a batch of egg whites one may see the eggs being lapped and lifted inward toward the center of the beater, and also see how part of the batch is being thrown outwards through the wires of the beater. This action results in the albumen being stretched and exposed to the air, collecting together and forming into small foam bubbles. The whisk is started off at a medium speed, and just as soon as the foaming of the batch is apparent the speed of the whisk can be advanced to a speed just under the splashing point. The latter is determined somewhat by the quantity of eggs being whipped.

As the batch progresses and expands upon formation of the foam bubbles the beating action continues as described above. By reason of the eccentric construction of the frames and the novel arrangement of the wires, a combined inward or centripetal and outward or centrifugal action is imposed upon the batch, this action being continuous throughout the depth of the whisk but somewhat amplified as the batch rises toward the top of the whisk. With this combined centripetal and centrifugal action flour may be "folded in" very readily, and when the flour is added to the batch it disappears into the foam and is quickly and thoroughly mixed therein.

With this and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 2 is a partial side elevation of Fig. 1;

In carrying the invention into effect there is provided a driving shank, a pair of arcuate frames carried by said shank and disposed in eccentric relation to said shank, and a series of bent wires on each of said frames having their loops disposed below the frames and their ends fixed in their respective frames. In the best constructions contemplated the loops of the bent wires may be mounted in a reinforcing rib connecting the two frames, and the latter may be channel-shaped, the flanges thereof being provided with holes and the ends of the wires being inserted into the holes and bowed therebetween to hold the ends of the wires in the frames. These various means and parts may be widely varied in construction for the particular device selected to illustrate the invention is but one of many possible concrete embodiments of the same. The invention, therefore, is not to be restricted to the specific construction shown and described.

Figure 1:
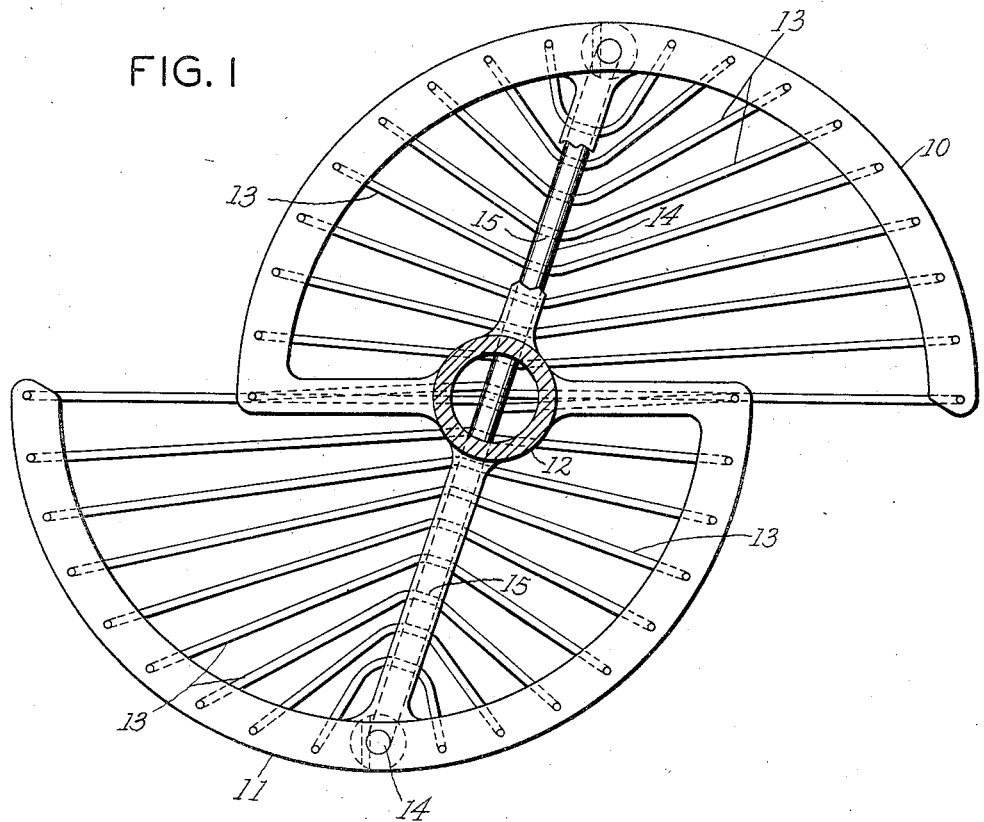
Fig. 1 is a plan view of the eccentric whisk, showing the fastening of the reinforcing rib and also the mounting of the wire whips.

Referring to the drawings, the whisk consists of a set of arcuate frames 10 and 11, which may be semi-circular as shown and are offset or eccentric with respect to the driving shank 12 and may be eccentric to each other as shown. Each of the said frames 10 and 11 is equipped with a series of bent wires 13, the lower loops of which are supported by a rigid reinforcing rib 14 extending from one semi-circular frame to the other frame. The wires 13 may pass from a portion of one semi-circular frame downward through openings 15 in the rib 14 and back to the same frame on the other side of the rod, as shown in Fig. 1, or may be brought back to the same side of the frame.

Figure 3:
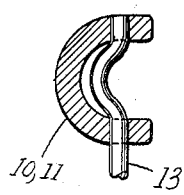
Fig. 3 is a detail sectional view showing the manner of securing the wire whips in the eccentric whip frame.

Referring now to Fig. 2, the wires 13 of one sector only are shown as it would result in a confusion of lines to illustrate the wires of the opposite sector also. The ends of the wires 13 pass through opposed holes in the flanges of the frames 10 and 11, the portion of the wire between adjacent surfaces of the flanges being bowed as shown in Fig. 3 to prevent displacement of the wires.

The mounting of the wires 13 heretofore described, produces a rigid and sturdy whisk in which there is less breakage of the wire whips due to their more rigid support, thus overcoming the disadvantage of previous types of whisks.

The novel arrangement of the wire whips 13 produces a scooping or cupping effect on the ingredients acted upon, that is, the leading faces of the wires 13 tend to move the ingredients inward from the side of the mixing bowl while whirling the same around, thus producing a well mixed batch.

Figure 4:
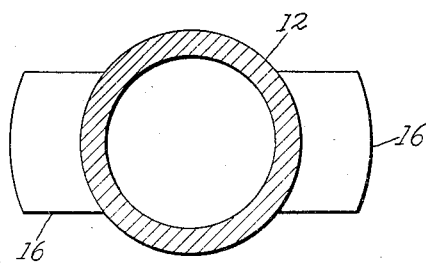
Fig. 4 is a detail sectional view of the driving shank of the whisk showing the driving lugs which fit the beater spindle of the mixing machine.

The driving shank 12 is provided with driving lugs 16 (see Fig. 4) which fit the driving spindle of the mixing machine.

Figure 5:
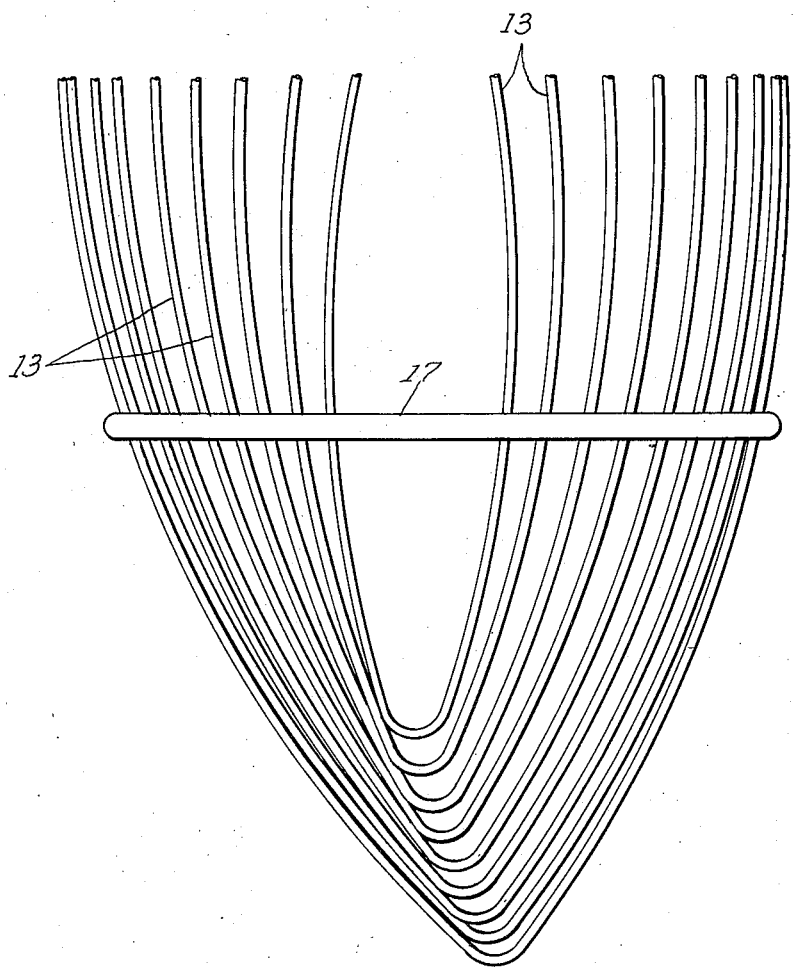
Fig. 5 is a partial side elevation of the whisk showing a modified form of construction for retaining the wire whips.

Referring to Fig. 5, the wires 13 are supported in the frames 10 and 11 in the same manner as heretofore described, a reinforcing band 17 being substituted for the reinforcing rib 14. The said band 17 is formed to suit the circumference of the wires 13, the band being placed mid-way down the length of the wires 13 and provided with openings through which the wires pass. The ends of the wires are fixed in the manner shown in Figs. 1 to 3 in eccentric frames (not shown) carried by a driving shank adapted to be inserted into the driving spindle of the mixing machine.

What is claimed is:

1. In a whisk, the combination with a driving shank, of a pair of arcuate frames carried by said shank and disposed in eccentric relation to said shank, and a series of bent wires on each of said frames having their loops disposed below the frames and their ends fixed in their respective frames.

2. In a whisk, the combination with a driving shank, of a pair of arcuate frames carried by said shank and disposed in eccentric relation to each other and said shank, a downwardly bowed reinforcing rib connecting said frames, and a series of bent wires on each of said frames having their loops mounted in said rib and their ends fixed in their respective frames.

3. In a whisk, the combination with a driving shank, of a pair of arcuate frames carried by said shank and disposed in eccentric relation to each other and said shank, a downwardly bowed reinforcing rib connecting said frames, and a series of bent wires on each of said frames having their loops mounted in said rib and their ends fixed in their respective frames, the frames being channel-shaped and the flanges of said frames being provided with holes, and the ends of the wires being inserted into the holes and bowed therebetween to hold the ends of the wires in the frames.

4. In a whisk, the combination with a driving shank, of a pair of arcuate frames carried by and disposed in eccentric relation to said shank, a series of bent wires on each of said frames having their loops disposed below the frames and their ends fixed in their respective frames, and a reinforcing band connecting portions of the wires which are intermediate the loops and the ends of the wires.

5. In a whisk, the combination with a driving shank, of a pair of arcuate frames carried by said shank and disposed in eccentric relation to said shank, and a series of bent wires having their loops disposed below the frames and their ends fixed in said frames.

WALTER FRANKLIN DEHUFF.